(12) United States Patent
Poddar et al.

(10) Patent No.: US 8,828,243 B2
(45) Date of Patent: Sep. 9, 2014

(54) SCANNING PROBE HAVING INTEGRATED SILICON TIP WITH CANTILEVER

(75) Inventors: Rakesh Poddar, Santa Clara, CA (US); Ami Chand, Fremont, CA (US)

(73) Assignee: Applied Nanostructures, Inc., Santa Clara, CA (US)

( * ) Notice: Subject to any disclaimer, the term of this patent is extended or adjusted under 35 U.S.C. 154(b) by 447 days.

(21) Appl. No.: 12/874,879

(22) Filed: Sep. 2, 2010

(65) Prior Publication Data

US 2012/0060244 A1    Mar. 8, 2012

(51) Int. Cl.
*G01Q 70/08* (2010.01)
*G01Q 60/38* (2010.01)
*G01Q 70/10* (2010.01)
*B82Y 35/00* (2011.01)

(52) U.S. Cl.
CPC .................. *G01Q 60/38* (2013.01); *B82Y 35/00* (2013.01); *G01Q 70/10* (2013.01)
USPC .......................................................... 216/11

(58) Field of Classification Search
CPC ....... B82Y 35/00; G01Q 60/38; G01Q 70/10; G01Q 70/16; Y10S 977/873
USPC ............... 216/11; 250/216; 438/703; 73/105; 850/40, 53, 57, 60, 9
See application file for complete search history.

(56) References Cited

U.S. PATENT DOCUMENTS

| | | | |
|---|---|---|---|
| 4,943,719 A | 7/1990 | Akamine et al. | |
| 5,021,364 A * | 6/1991 | Akamine et al. | 850/60 |
| 5,221,415 A * | 6/1993 | Albrecht et al. | 216/2 |
| 5,386,110 A | 1/1995 | Toda | |
| 5,753,912 A * | 5/1998 | Matsuyama | 850/60 |
| 5,811,017 A * | 9/1998 | Matsuyama | 216/11 |
| 6,958,124 B2 | 10/2005 | Lutter | |
| 6,979,407 B2 | 12/2005 | Lutter | |
| 2005/0051515 A1* | 3/2005 | Nam | 216/27 |

* cited by examiner

*Primary Examiner* — Duy Deo
*Assistant Examiner* — Erin Bergner
(74) *Attorney, Agent, or Firm* — Mark Rodgers

(57) ABSTRACT

A cantilever-tip assembly for atomic force microscopy (AFM) or other scanning probe microscopy and its method of making based on micro-electromechanical systems (MEMS). Two crystalline silicon wafers and attached oxide and nitride layers are bonded together across an intermediate dielectric layer. A thin cantilever with a tetrahedral silicon probe tip at its distal end are formed in one wafer by anisotropic etching of silicon and a support structure is formed in the other wafer to support the proximal end of the cantilever preferably having an inclined face formed by anisotropic silicon etching. The cantilever may be silicon or silicon nitride.

7 Claims, 16 Drawing Sheets

SCANNING PROBE HAVING INTEGRATED SILICON TIP WITH CANTILEVER

FIELD OF THE INVENTION

This invention relates generally to a fabrication method utilizing micro-electro-mechanical system (MEMS) processes to develop a sharp single crystal silicon tip at the free end of a micro cantilever, which can be made of single crystal silicon or other thin films, for use in scanning probe microscopes and other related microscopy systems.

BACKGROUND ART

Atomic force microscopy (AFM) allows high resolution surface imaging by scanning a sharp tip over a surface while controlling the interaction force between the tip and surface. AFM typically relies on a micromachined cantilever with a sharp tip at the distal or free end of the cantilever as a force sensor to detect the interaction between the tip and the sample. The force of the interaction of the tip is sensed by the resultant deflection of the cantilever on which the tip is mounted. The role of the cantilever is to translate the force acting on the tip into a deflection that can be subsequently monitored by various means. Several methods of detecting the deflection of the cantilever are available such as electron tunneling, capacitance, optical interferometry, optical polarization and optical deflection. Such cantilever probes can be used in other types of scanning microscopy.

Various methods for fabrication of a cantilever stylus with the integrated tip have been proposed since the invention of the AFM by Gerd Binnig, Calvin Quate and Christopher Gerber in 1986. Albrecht et al. in 1990 proposed several methods to fabricate thin film cantilevers with integrated pyramidal tips. Since then, many processes involving dry and wet etching have been proposed and developed for the fabrication of a cantilever-tip assembly. Of these, a prominent method described by Akamine et al. in U.S. Pat. No. 5,021,364 fabricates the cantilever stylus made of thin films with an integrated silicon tetrahedral tip. This method was intended for batch fabrication of the cantilever-tip assemblies for AFM applications. Toda in U.S. Pat. No. 5,386,110 proposes another method to overcome some process limitations of the previous method.

Akamine et al. propose fabricating a silicon membrane followed by lithographic definition of the cantilever on a membrane. To create a self-aligned perpendicularly extending sharp tetrahedral tip on the distal end of the cantilever, reactive ion etching (RIE) of the cantilever followed by thermal oxidation will lead to oxide growth only on the sidewalls, the top surface being protected by silicon nitride. The nitride is then selectively removed from the cantilever and anisotropically thin the silicon on the cantilever. The anisotropic etchant does not etch through the tetrahedral volume of silicon at the end of the cantilever since it is bound by the silicon nitride from the bottom, oxide on the sidewalls, and a (111) silicon crystal plane.

Although the Akamine process is very robust, it presents some inherent process difficulties. The thickness of membrane determines the thickness of the cantilever and the height of the tip. The definition of the membrane of exact thickness becomes very difficult and requires high level of control during wet etching. Lithography on a thin silicon membrane is very difficult, and the chances of wafer breakage are also very high during the lithography process. The method also requires precise alignment for selectively removing nitride from the cantilever to form the tip by anisotropic etching, which again is a drawback in batch fabrication of the cantilever chip with precision. Another limitation is the inherent inability of this process to fabricate rectangular single crystal silicon cantilevers, thus limiting its use to fabricate thin film cantilevers for a restricted set of applications.

As an alternative to the Akamine process, Toda proposes a method using a wafer having a etch stop layer as the starting wafer. In this process, silicon nitride films are deposited on the two opposed surfaces of the starting wafer. The silicon nitride film on the lower surface is selectively removed and silicon is anisotropically etched until the etch stop layer is reached. The exposed etch stop layer is then removed by wet or dry etching and silicon nitride film is deposited on the etched side. A rectangular pattern is defined on the front surface using photolithography. The silicon nitride film and the silicon inside the rectangular pattern is etched through the hole until the lower portion is reached. The exposed silicon sidewalls of the hole are then oxidized to form a silicon dioxide film. The silicon nitride film on the top surface is removed and the exposed silicon is etched using wet anisotropic etching, to obtain the tetrahedral tips on the distal end of the cantilever.

Though Toda's method addresses the problem evident in Akamine et al. of controlling the thickness of the membrane by using an etch stop layer, it still requires a lithography to be performed on a thin silicon layer to etch the hole. Hence, handling of the wafer becomes very critical during the lithography step. Also the method does not address the inability of previous processes of fabricating rectangular cantilevers made of single crystal silicon. Though Toda proposes an embodiment to fabricate silicon cantilevers using heavily doped boron layer as the etch stop layer and later using this layer for the cantilever, the implementation of such a scheme is expensive and complex, which increases the cost of mass fabrication.

SUMMARY OF THE INVENTION

The current invention addresses the drawbacks mentioned above in the prior-art technology. The various aspects of the invention provide a robust and economical process for batch fabricating a plurality of cantilever assemblies, each having a sharp, self-aligned tetrahedral tip at the extreme end of cantilever. The invention allows the requirement of only two mask step for fabricating a complete scanning probe assembly including cantilever, tip, and holding chip, compared with three or more mask steps in the prior art. The process may rely upon standard processes for micro-electro-mechanic systems (MEMS).

In one aspect of the invention, a silicon cantilever is formed which is supported at its proximal end on a support substrate and a self-aligned tip is formed at the distal end of the cantilever.

Alternatively, the silicon can be removed from the cantilever to isolate the silicon tip and to rely upon a silicon nitride layer for the cantilever.

The silicon tip formed in a <100> oriented monocrystalline silicon wafer may have a tetrahedral shape with three planes, one of which is bound by the (111) plane. The other two planes are inclined at an angle of 85° from the base determined by the <100> orientation of the wafer. These planes are formed in wet anisotropic etching producing convex corner undercutting of the free end of the cantilever when the cantilever is patterned in the (100) plane such that its free end is parallel to the (110) plane.

The process involves patterning of the cantilever mask on one side of the (100) double side polished silicon wafer which will be referred to as the first or probe wafer for subsequent discussion. In the embodiment of a silicon cantilever, silicon dioxide is deposited on the probe wafer. The cantilever is lithographically defined into a thermally grown or deposited mask layer for the subsequent wet anisotropic etching of the cantilever.

In an embodiment of a silicon nitride or similar dielectric cantilever, deposited silicon nitride or any other suitable masking material can also be used to pattern the cantilever.

The probe wafer is then bonded with another doubleside polished silicon wafer having a <100> orientation (referred to as second or support wafer) such that the cantilever pattern is sandwiched between the two wafers.

Silicon nitride or other suitable masking material can be deposited on the support wafer and patterned for a support structure for the cantilever to be formed from sandwiched structure on the probe wafer. The support wafer is then etched anisotropically using a wet etchant until the cantilever pattern in the probe wafer is reached. As an alternative embodiment to this step, anisotropic dry etching can also be used to etch the support wafer with either photoresist or any other suitable masking material.

The probe wafer is thinned either during the patterned etch of the second wafer or can be thinned by polishing. Thinning of the probe wafer can be done either before or after the bonding of the two wafers. The thickness of the probe wafer defines the thickness of the cantilever for a silicon cantilever and the height of the tip or a suitable combination of the two thereof. After the second wafer is etched, the wet anisotropic etching continues on the first wafer with the cantilever mask.

After the etching is completed, a thick oxide is grown or deposited on the backside of the wafer assembly such that it covers the sidewalls of the cantilever. Alternatively, silicon nitride or any other masking material for wet anisotropic silicon etching can also be deposited. The etching then continues from the front side until the desired thickness of the cantilever is achieved. The etching on the free end of the cantilever is bound by the (111) plane since the side walls are protected by silicon dioxide or silicon nitride deposited in an earlier step. This phenomenon is not observed on the sides of the cantilever as the side walls form an angle of 54.7° at (111) plane with respect to the etching (100) plane. The etching on the front side is also bound by the (111) plane at an angle of 54.7°. Hence, the resultant effect will be the complete removal of silicon from the side walls. However, on the free end of the cantilever, convex corner etching causes two planes to be formed at an angle of 65° from one another and at an angle of approximately 75° from the etching (100) plane. The front surface etching is bound by the (111) plane at an angle of 54.7°. Hence the resultant effect will be formation of the tip with a cone angle of approximately 20°. However, the invention is not limited to this particular set of angles.

BRIEF DESCRIPTION OF THE DRAWINGS

FIG. 14 contains all the elements of FIG. 2.

DETAILED DESCRIPTION OF THE PREFERRED EMBODIMENTS

Figure 1:
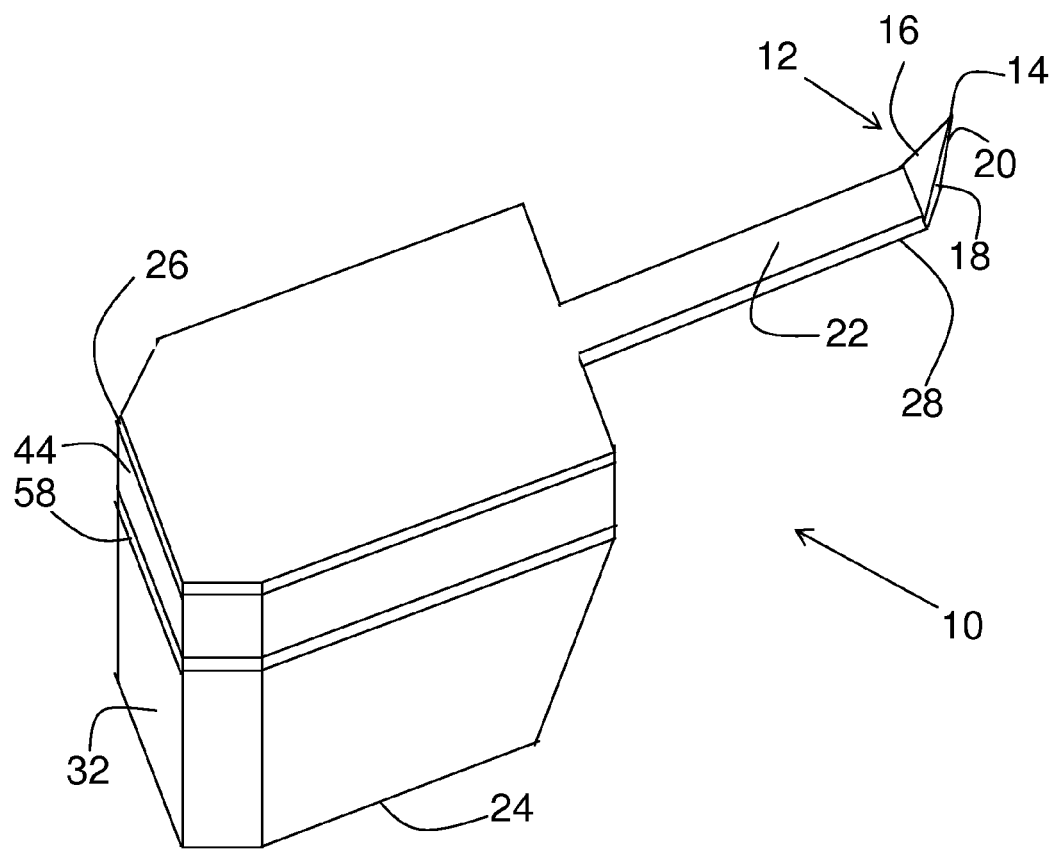
FIG. 1 is an isometric view of an embodiment of a silicon cantilever chip assembly with embedded tetrahedral silicon tip.
Figure 2:
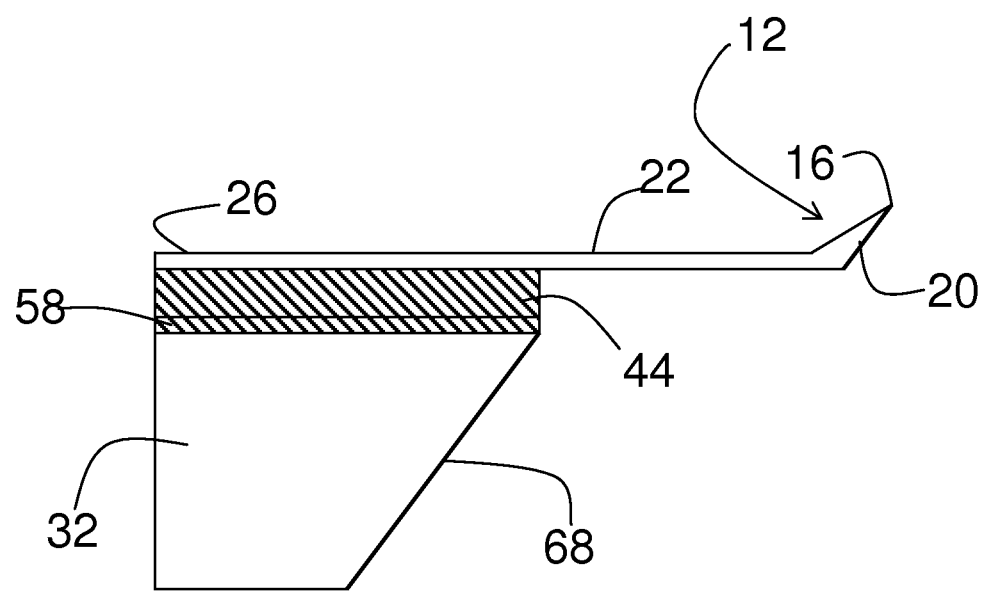
FIG. 2 is a cross-sectional view of the cantilever chip assembly of FIG. 1.

A probe assembly 10 of a first embodiment of the invention, illustrated in the orthographic view of FIG. 1 and the sectioned view of FIG. 2, may be formed by conventional processes well known for micro-electromechanical systems (MEMS). A triangular (tetrahedral) tip 12 terminating in a sharp apex 14 is formed of a first inclined surface 16 and two second inclined surfaces 18 separated by an inclined corner 20. The tip 12 extends upwardly and outwardly from a free or distal end of a cantilever 22, the fixed or proximal end of which is attached to and supported by a support 24. In this embodiment, the cantilever 22 is continuous with a cantilever layer 26 on top of the support 24. In use, the tip 12 points downwardly toward a sample being probed, but the opposite orientation is used here to clearly show the tip 12 and its formation. The support 24 is only partially illustrated and typically forms a support frame having an aperture over which the cantilever 22 and attached tip 12 extend. A bottom surface 28 of the cantilever 22 opposite to the side of the tip 12 forms a reflective surface for the laser beam during scanning probe microscopy. The formation of the tip 12 may be self aligned and does not require any special mask for its formation. The process of fabricating the entire chip assembly is highly reproducible and requires only two masks, one for the cantilever and one for the support frame. The cantilever 22 has a proximal end supported on the support 24 and has a generally planar structure, in this embodiment with two parallel edges, projecting away from the support 24 and not otherwise supported. Its distal end supporting the tip 12 is free and not otherwise supported except through the cantilever.

Figure 3:
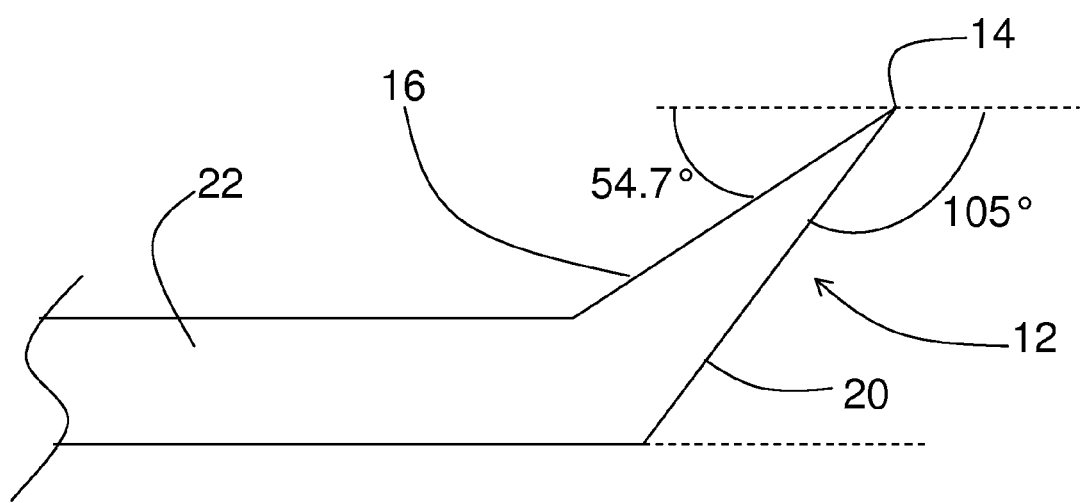
FIG. 3 is a cross-sectional view of the tip detailing the angles of the tip faces with the horizontal.

With the use of a silicon wafer with a <100> crystalline direction to form the tip 12 and cantilever definition along the <110> direction of the silicon, the tip 12 forms, as shown in the cross-sectional view of FIG. 3, as a structure having the back facet 16 inclined at 54.7° from the horizontal, indicated by the two dotted lines, and the corner 20 between the two front facets 18 of 105° resulting in a tip angle of 21.3° along the median of the horizontally extending cantilever 22.

Figure 4:
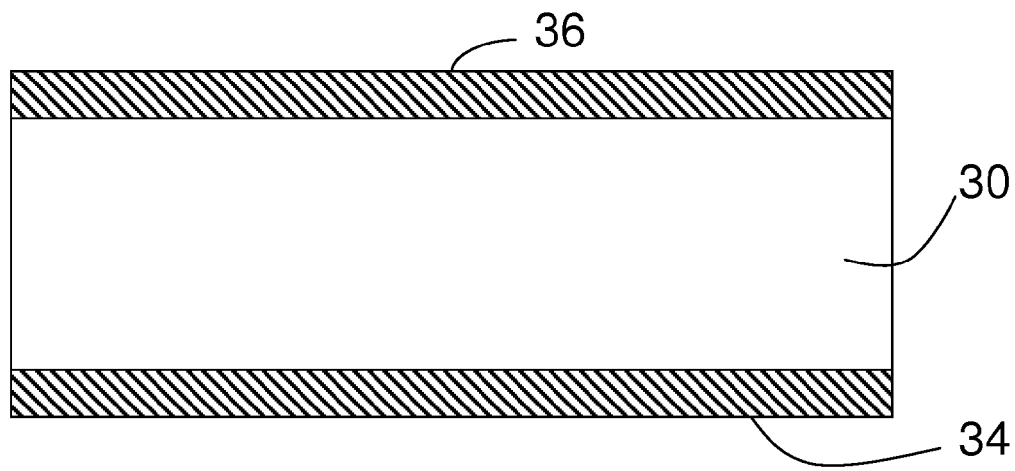
FIG. 4 is a cross-sectional view of the starting probe wafer on which the cantilever and tip will be developed including initial oxide layers.
Figure 5:
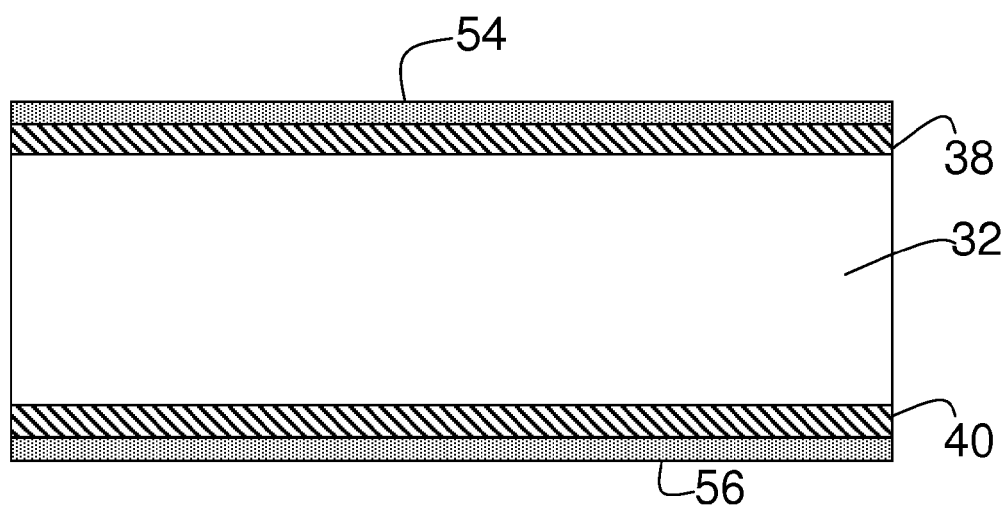
FIG. 5 is a cross-sectional view of the starting support wafer on which the support structure will be developed including initial oxide and nitride layers.

This described process embodiment begins with two silicon wafers, a first, probe wafer 30, illustrated in the cross-sectional view of FIG. 4, and a second, support wafer 32, illustrated in the cross-sectional view of FIG. 5. The wafers 30, 32 will be individually processed and then bonded together, and the bonded assembly is further processed, as will be described hereafter in detail. Each wafer 30, 32 is essentially monocrystalline because the anisotropic etching relies upon the crystalline planes exposed at different surface. It is understood that there may be localized impurities and crystalline imperfections in the silicon, but the majority of each wafer consists of silicon having the same crystalline orientation within ±5°. In the described preferred embodiment, both wafers 30, 32 have a <100>orientation, that is, with principal surface extending parallel to a (100) crystalline plane. Alternatively, the cantilever and support wafers could be of a different orientation like <110> or <111> or of a dissimilar combination. Both wafers 30, 32 are polished on both their opposed principal surfaces to facilitate later wafer bonding. The polished wafers 30, 32 are thermally oxidized to form an upper oxide layer 34 and a lower oxide layer 36 on the opposed principal surfaces of the probe wafer 30 and an upper oxide layer 38 and a lower oxide layer 40 on the opposed principal surfaces of the support wafer 32. The oxide layers 34, 36, 38, 40 are composed of silicon dioxide having a thickness in the exemplary range of 10 nm to 2 µm for all oxide layers, for example, 200 nm. The oxide layers may alternatively be deposited by, for example, chemical vapor deposition (CVD) or plasma enhanced CVD.

Figure 6:
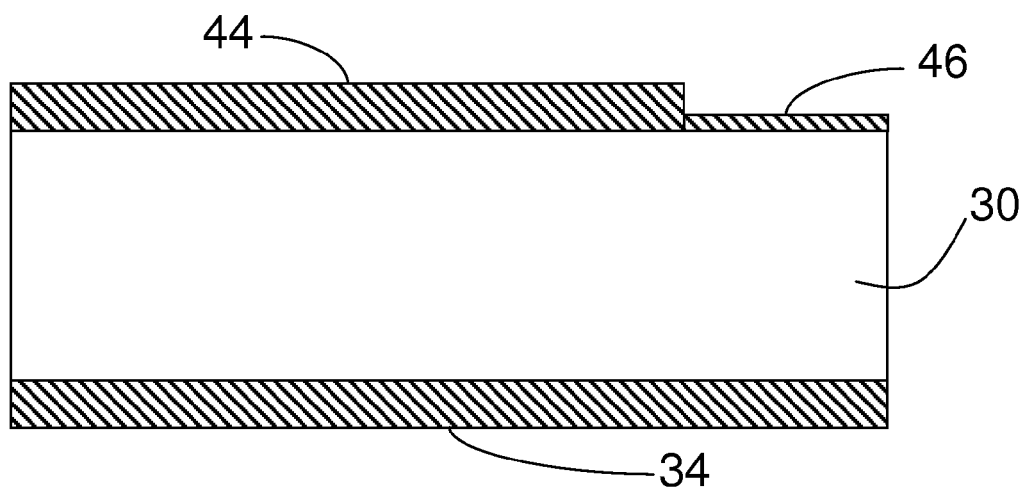
FIG. 6 is a cross-sectional view of the probe wafer after definition of the cantilever pattern in one of the oxide layers.

As illustrated in the cross-sectional view of FIG. 6, a photoresist layer is patterned, using a photolithographic process, over the lower oxide layer 36 of the probe wafer 30 and the oxide is then etched to define a cantilever mask 44 in the oxide. A useful oxide wet etchant is the conventional buffered oxide etch (BOE), but the oxide may alternatively be etched using a dry etch process. A nitride hard mask may also be patterned by the photoresist, which then acts as an etching mask for the oxide. The etching may not extend through the wafer oxide layer 36 so that a thin oxide layer 46, referred to as the gap oxide layer 46, remains. Alternatively, the oxide may be completely etched through and the very thin gap oxide layer 46 is then thermally grown. A top view of the full cantilever mask 44 is shown by the frame structure of FIG. 15 including a frame 48 surrounding the cantilever mask 44 with a gap 50 between them. Although the illustrated cantilever mask 44 produces a generally rectangular cantilever, other shapes are possible including triangular shapes and apertured shapes.

Figure 7:
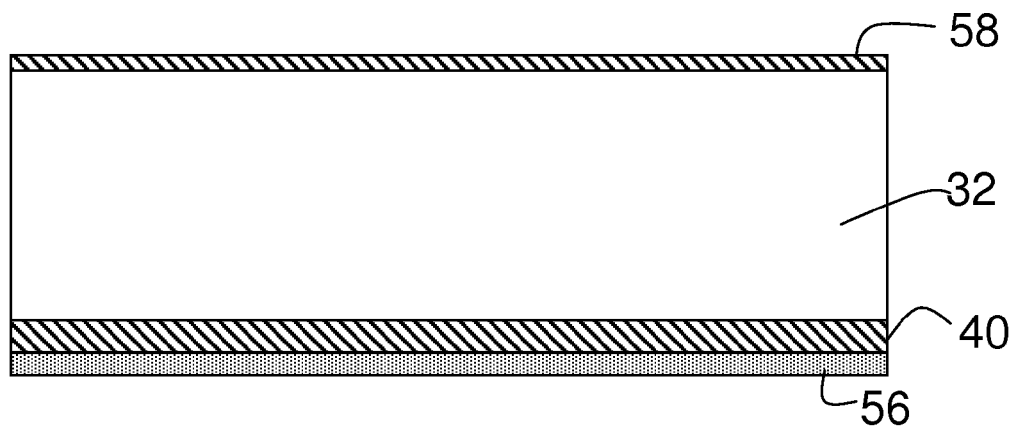
FIG. 7 is a cross-sectional view of the support wafer after one of the nitride layers has been removed.

Returning to FIG. 5, an upper support nitride layer 54 and a lower support nitride layer 56 are deposited over the support oxide layers 38, 40 on both principal surfaces of the support wafer 32, for example, by CVD to a thickness in the exemplary range of 10 nm to 1 µm for all nitride layers, for example, 200 nm. A nitride layer in this embodiment is understood to be principally composed of silicon nitride having a composition of approximately $Si_3N_4$, although significant variations of the stoichiometry occur in its formation by CVD as is well known in the art. The upper support nitride layer 54 is removed to re-expose the upper support oxide layer 38. The upper support oxide layer 38 is then thinned to a thickness of about 50 nm to form, as illustrated in the cross-sectional view of FIG. 7, a thinned upper support oxide layer 58 Alternatively to achieve better uniformity, the upper support oxide layer 38 may be completely etched through, and then the underlying support wafer 32 is thermally oxidized to form the thin upper support oxide layer 58.

The preceding steps need to carefully maintain the uniformity of the layers to facilitate the wafer bonding, for example, by fusion bonding under pressure at a high temperature for an extended time. As illustrated in the cross-sectional view of FIG. 8, the probe wafer 30 and support wafer 32 are placed together with the cantilever mask 44 juxtaposed to the thinned upper support oxide layer 58. Uniformity of the exposed surfaces of the cantilever mask 44 and thinned upper support oxide layer 58 is especially important. In the bonded assembly of the probe wafer 30 and the support wafers 32, voids 60 are formed at the edges of the vertical structure between the gap oxide layer 46 and the thinned upper support oxide layer 58. The voids 60 are filled with air or vacuum depending upon the bonding mechanism.

Figure 9:
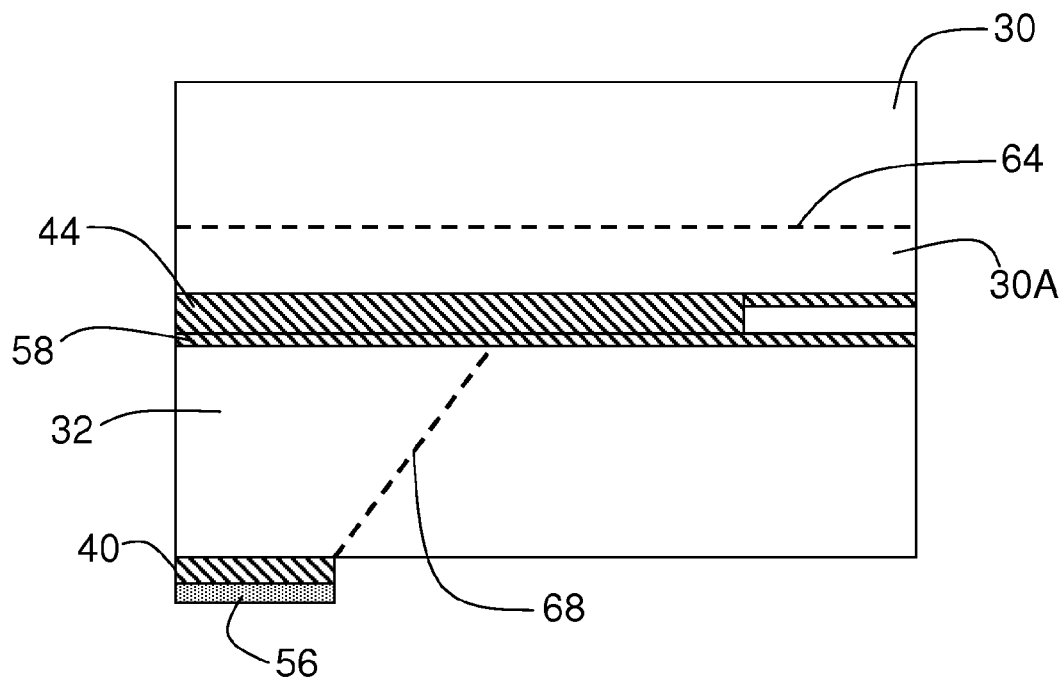
FIGS. 9-14 are cross-sectional view sequentially illustrating the steps in the manufacturing of a first embodiment of a probe chip assembly including a silicon cantilever.
Figure 10:
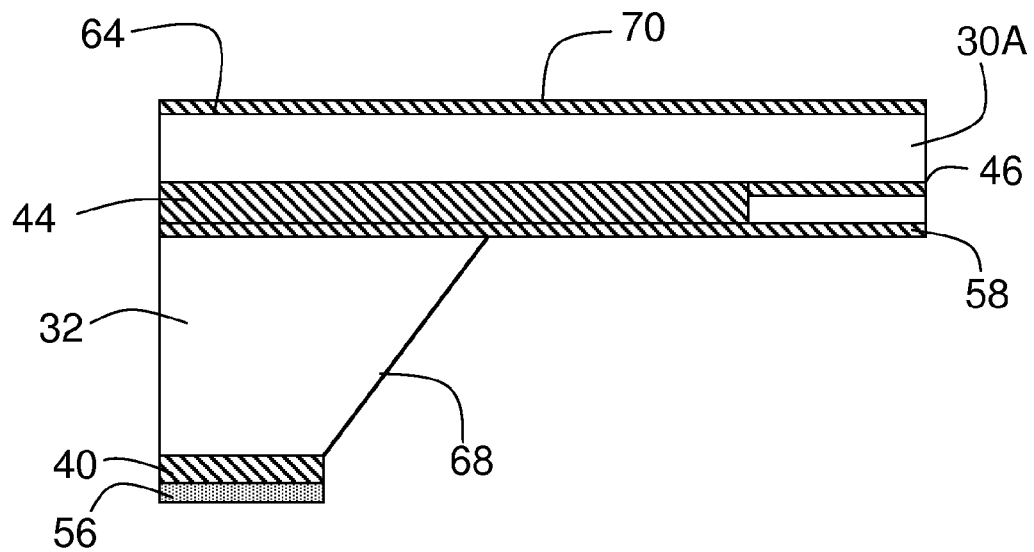

On the top side of the bonded assembly, the upper cantilever oxide layer 34 is removed by etching, as shown in the cross-sectional view of FIG. 9 and the probe wafer 30 is partially etched to leave a remnant silicon film 30A having a exposed surface 64. The thickness of the remnant silicon film 30A is determined by the total requirement for tip height and cantilever thickness. A thick oxide layer 70 on top of the remnant silicon film 10A, as shown in the cross-sectional view of FIG. 10 is grown either by oxidation or deposited by CVD. The thick oxide layer 70 protects the silicon thin film 30A during the subsequent processing.

On the lower side, the lower support nitride layer 56 is photolithographically defined to form the support structure. The silicon nitride layer in exposed areas is etched using wet or dry etch processes. A useful wet nitride etchant is the conventional phosphoric acid. This support lithography is the second and final lithographic step needed in this embodiment of the process for forming the probe assembly. The patterned lower support nitride layer 56 is then used as a hard mask for etching the lower oxide support layer 40 and for anisotropically etching the support wafer 32. The anisotropic etch may be an etchant whose etching rate depends on the silicon crystalline plane such as a wet or liquid etch using hot potassium hydroxide (KOH) or tetramethylammonium hydroxide (TMAH), which forms an inclined surface 68 in the crystalline silicon inclined at 54.7° from the (100) silicon plane and bounded by the (111) plane. Alternatively, the support wafer 32 can be anisotropically etched in a dry or plasma process such as a standard silicon deep reactive ion etch (DRIE) process. The angle of plane 68 in the DRIE process is process dependent and can vary from 45° to 90°

Figure 8:
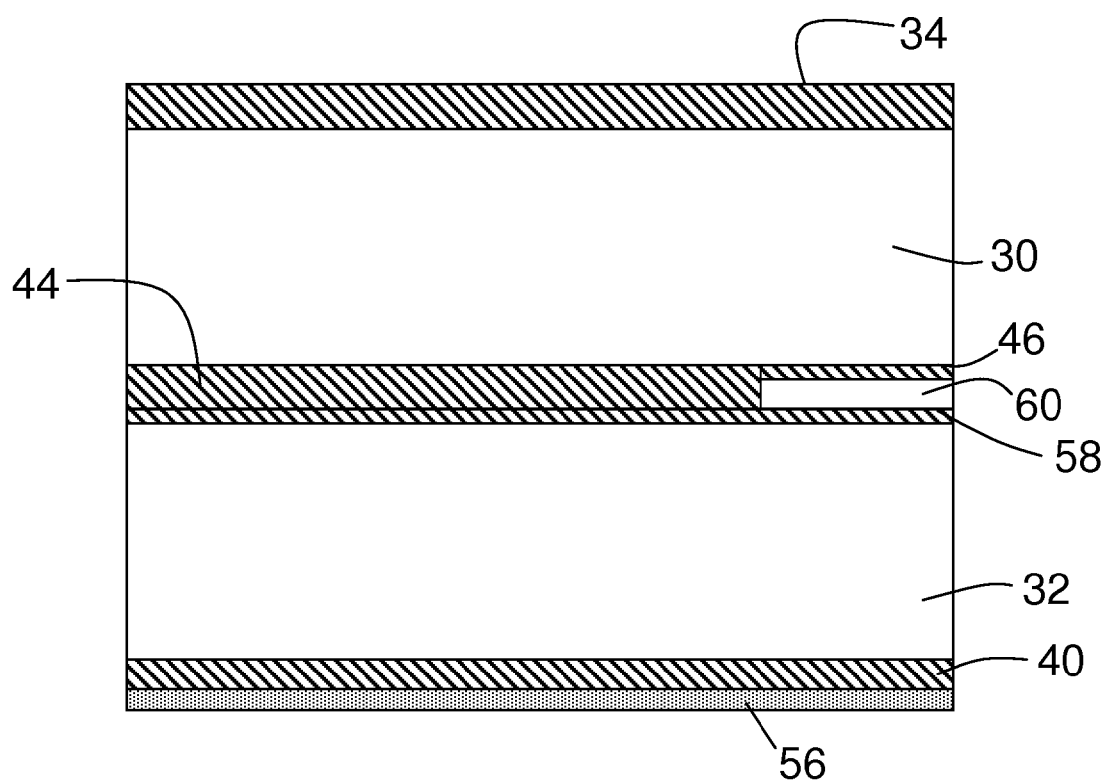
FIG. 8 is a cross-sectional view of the assembly after bonding of the cantilever and support wafers.

The structure shown in FIG. 10 can be achieved using an alternative processing sequence as well. The silicon etching of the upper and lower sides may be performed simultaneously with careful control of etch times and restraints on the thickness of the silicon film 30A. In one process embodiment allowing significant control, the upper cantilever oxide layer 34 of FIG. 8 is left to cover the probe wafer 30 while the bottom side patterning of the support lower nitride layer 56 is patterned and etched. The etching continues through the support lower oxide layer 50 and for a controlled depth into the support wafer 32 to a depth selected according to the desired thickness of the thinned silicon 30A. The upper cantilever oxide layer 34 is then removed, and the probe wafer 30 and support wafer 32 are simultaneously anisotropically etched. The oxide layer 70 is then grown to produce the structure of FIG. 10.

Figure 11:
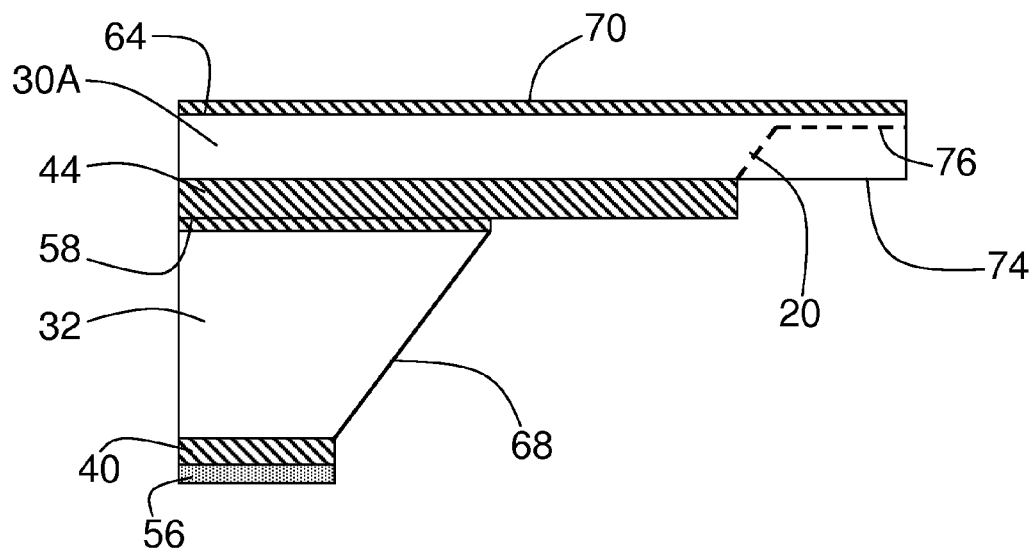

The exposed portions of the upper support oxide layer 58 and the thinned lower cantilever oxide layer 46 are etched in a buffered oxide etch solution or other wet oxide etchant to expose a silicon surface 74 illustrated in the cross-sectional view of FIG. 11. The oxide etching should be timed such that it does not completely etch the underlying lower cantilever oxide layer 44 and the oxide layer 70 on the top. The exposed silicon surface 74 of the silicon film 30A is then etched using wet silicon anisotropic etchants such as KOH, TMAH, etc. The anisotropic etching is stopped before it vertically etches through the silicon film 30A. This partial etching leaves a thin planar overhead projection 76, as shown in the cross-sectional view of FIG. 11. The etching around the rectangular end of the cantilever mask 44 exposes two convex corners 78, 80 of the remnant silicon film 30A, as illustrated in the plan view of FIG. 15. As the etching progresses, two convex structures develop into two inclined facets 12A, 12B. Eventually, these facets 12A, 12B become two side faces 18 of the tip 12 of FIG. 1 intersecting at the inclined corner 20.

Figure 12:
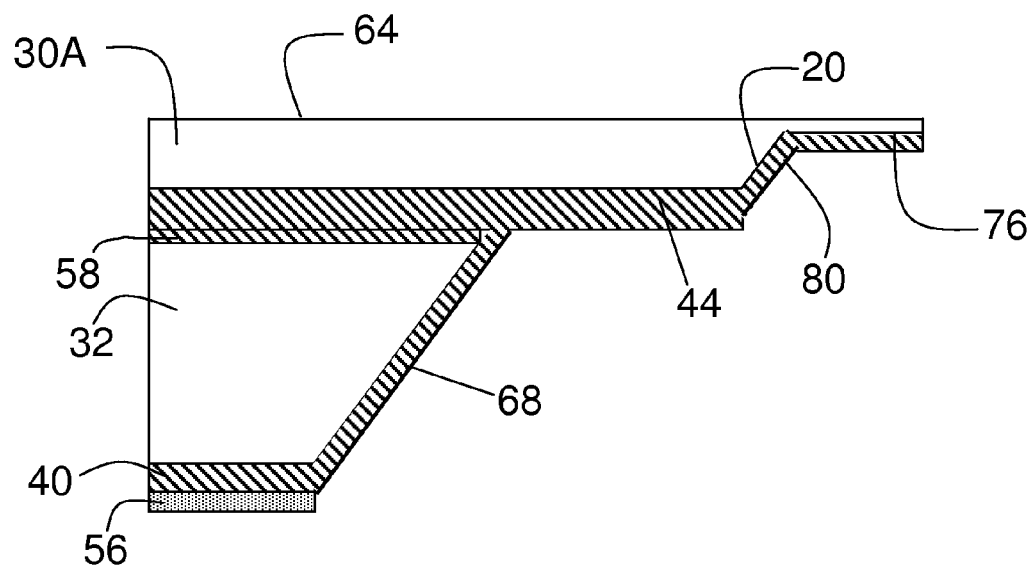
Figure 13:
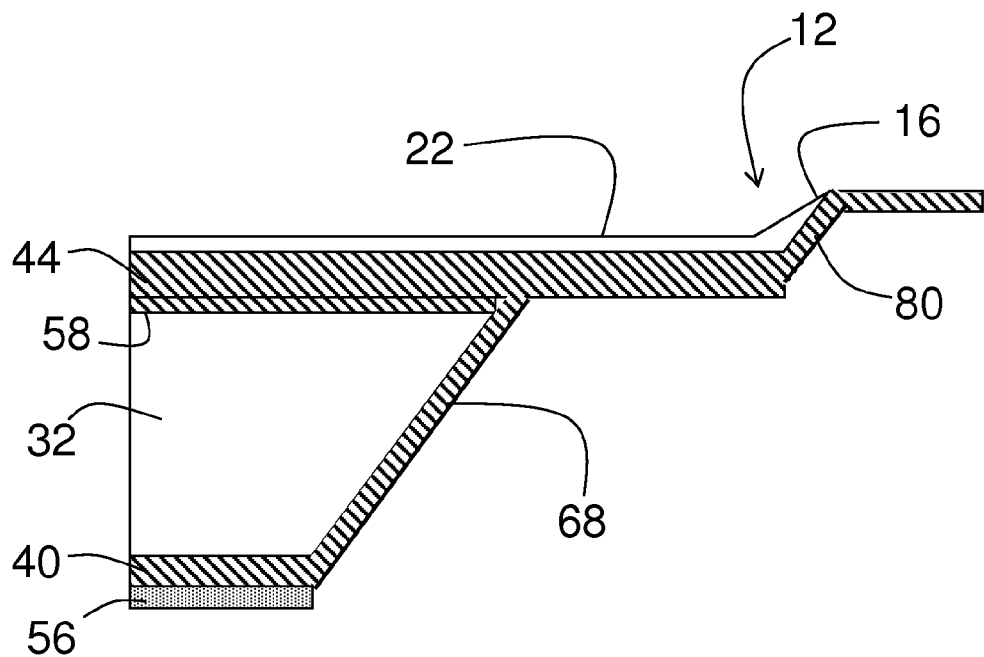

A thin oxide layer 80, illustrated in FIG. 12, is then grown to protect the exposed bottom portions of the etched silicon film including the facets 12A, 12B. Alternatively, a deposited layer of oxide, silicon nitride, or metal films such as Cr or Au can be used for this purpose. The requisite property of the protective film is that it should mask the silicon during the next step of wet anisotropic etching. The thick oxide layer 70 is then selectively etched from the top surface to expose the silicon surface 64. The silicon surface 64 is then subject to wet anisotropic etching in solutions such as KOH, TMAH, etc., as shown in the cross-sectional view of FIG. 13 to remove the thin overhead projection 76 and is continued into the silicon film 30A until a desired thickness of the cantilever 22 is achieved with the tip 12 at its distal end. Since the side walls of the free end of the cantilevered silicon film 30A are covered by the oxide layer 80, the inclined facets 12A, 12B are not etched but the inclined facet 16 is formed in the (111) silicon plane inclined at 54.7° to form the tip 12.

Figure 14:
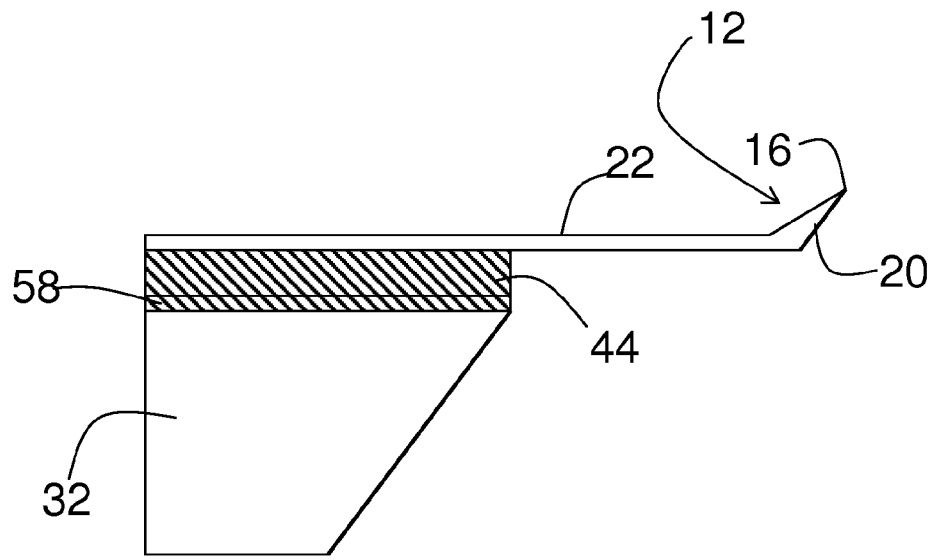
Figure 15:
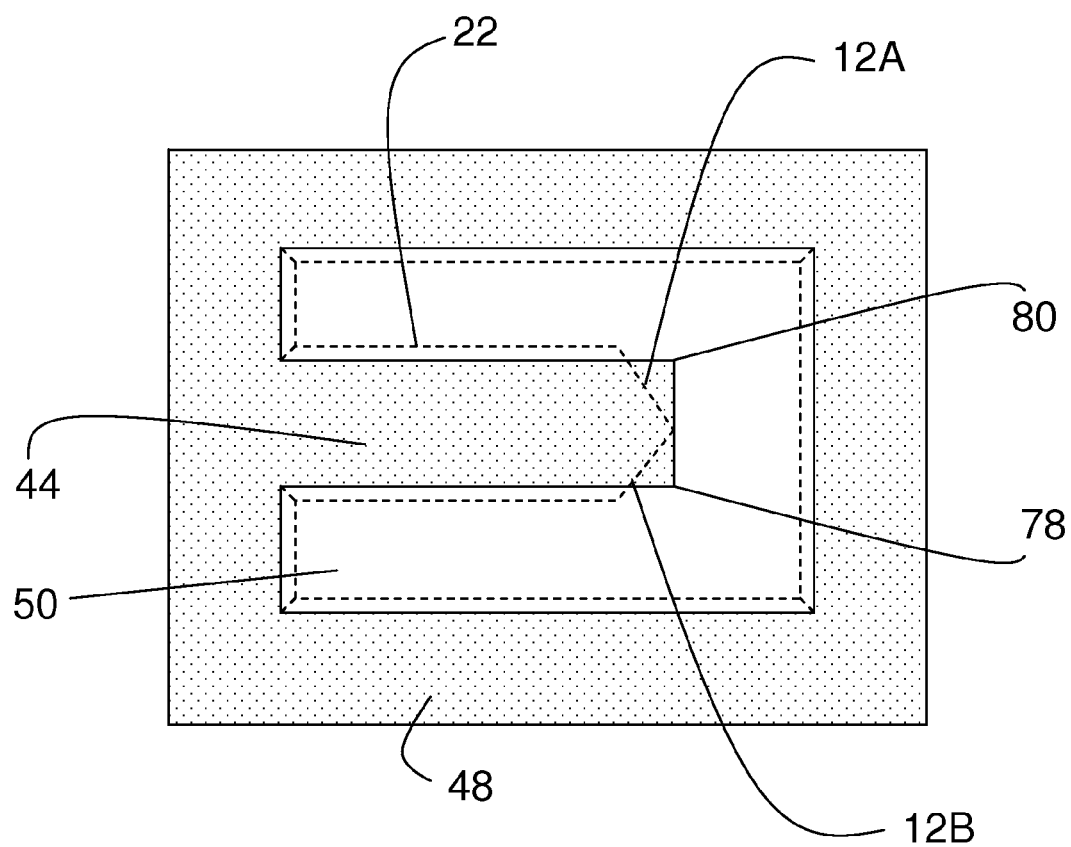
FIG. 15 is a top view of the cantilever of the first embodiment before and after etching. Solid lines show the cantilever before etching and dotted lines show the cantilever after etching.

In a final step, the oxide side wall 80 and the exposed portion of the cantilever oxide layer 44 are removed in a wet oxide etchant, as illustrated in the cross-sectional view of FIG. 14, to provide the final probe assembly, shown also in the plan view of FIG. 15 with the cantilever 44 supported at its proximal end by the frame 48 and projecting over the aperture 50 of the frame 48.

In batch fabrication, a number of such probe assemblies are simultaneously developed on the two wafers within a matrix or frame with gaps through the final support structure. At the completion of the above described fabrication steps, the individual probe assemblies may be separated from the matrix for use in microscopy.

Figure 16:
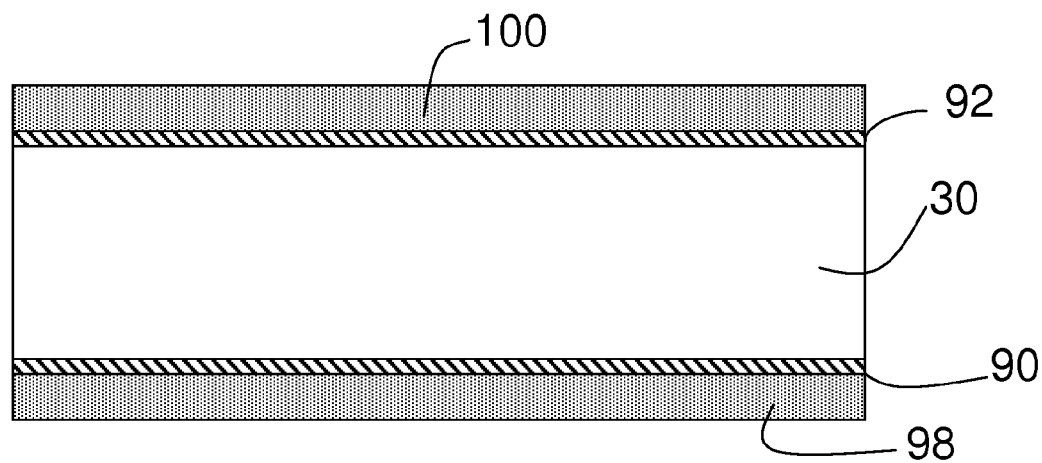
FIGS. 16-26 are cross-sectional views sequentially illustrating the steps in the manufacturing of a second embodiment of a probe chip assembly including a silicon nitride cantilever.
Figure 17:
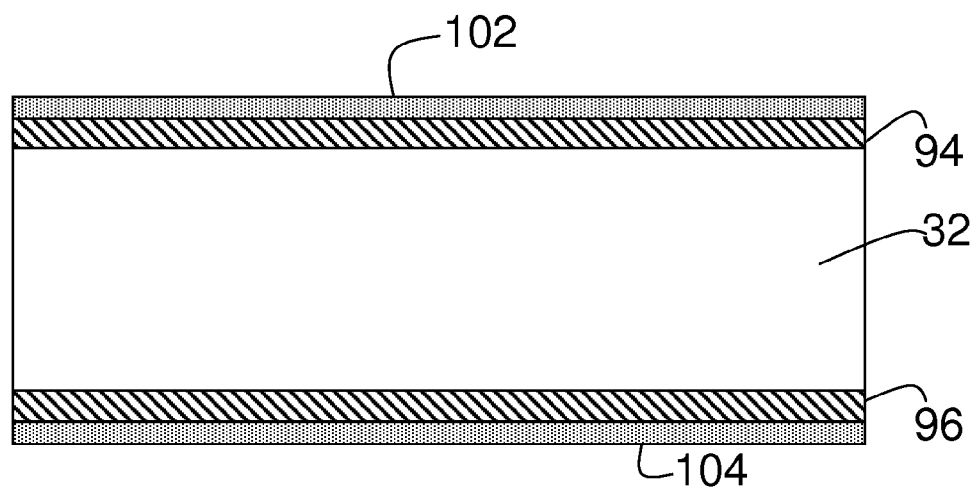
Figure 18:
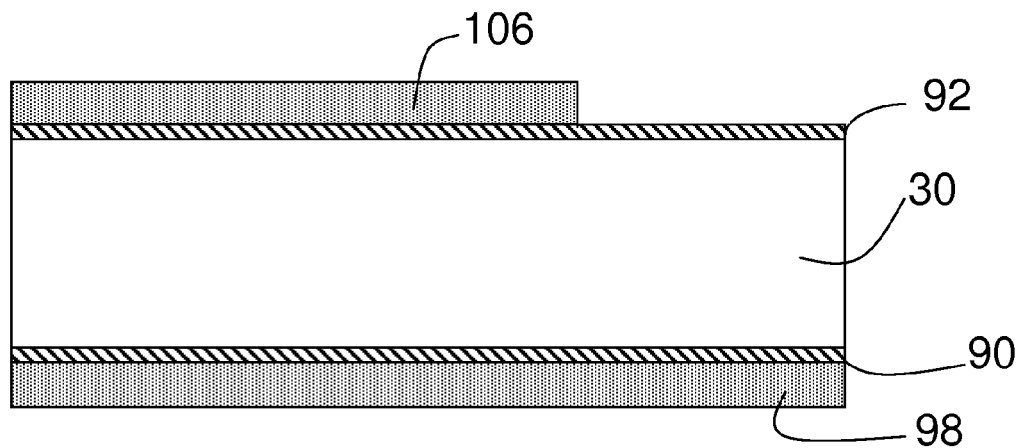
Figure 19:
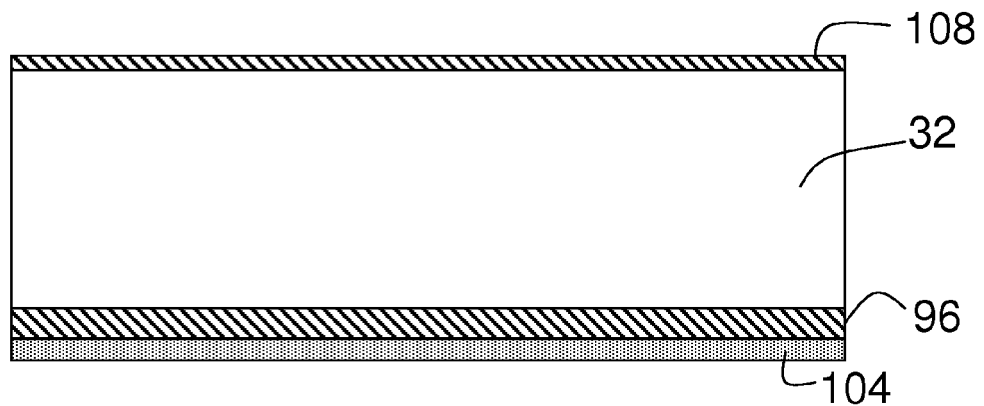

The above process can be adapted to fabricate a probe tip with a silicon nitride cantilever having the tetrahedral silicon tip on its free end. Silicon nitride cantilevers have the advantage that greater uniformity and thickness control can be achieved with lesser cantilever thicknesses. As in the first embodiment, the probe wafer 30 of <100> orientation illustrated in the cross-sectional view of FIG. 16 is thermally oxidized to form an upper cantilever oxide layer 90 and a lower cantilever oxide layer 92. Similarly, the support wafer 32 of <100> orientation illustrated in the cross-sectional view of FIG. 17 is also thermally oxidized to form an upper support oxide layer 94 and a lower support oxide layer 96. Silicon nitride is deposited on both wafers 30, 32, for example, by CVD to desired cantilever thickness to form upper cantilever nitride layer 98 and lower cantilever nitride layer 100 on the probe wafer 30 and upper support nitride layer and upper support nitride layer 102 and lower support nitride layer 104 on the support wafer 32. The nitride cantilever thickness may be in the previously mentioned nitride thickness range. The lower cantilever nitride layers 100 is photolithographically defined by photoresist and the exposed nitride is etched by a reactive ion etch (RIE) process to form a nitride cantilever mask 106 illustrated in the cross-sectional view of FIG. 18. On the other hand, the support wafer 32 the upper support nitride layer is blanket etched, for example by RIE, to produce as shown in FIG. 19 a thinned upper support oxide layer 108.

Figure 20:
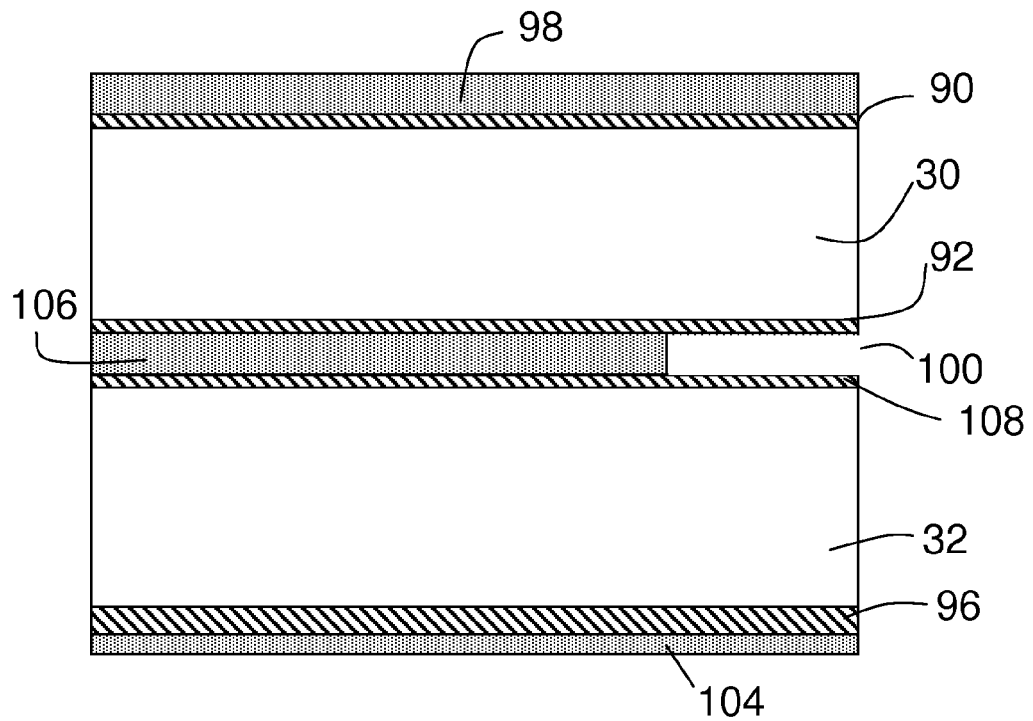

Both wafers 30, 32 are then thoroughly cleaned and then fusion bonded, as illustrated in the cross-sectional view of FIG. 20, to sandwich the nitride mask 106 and the upper support oxide layer 108 between the wafers 30, 32 with a void 100 at the distal end of the cantilever mask 106. The upper nitride and oxide layers 98, 90 are then etched away to expose the probe wafer 30.

Figure 21:
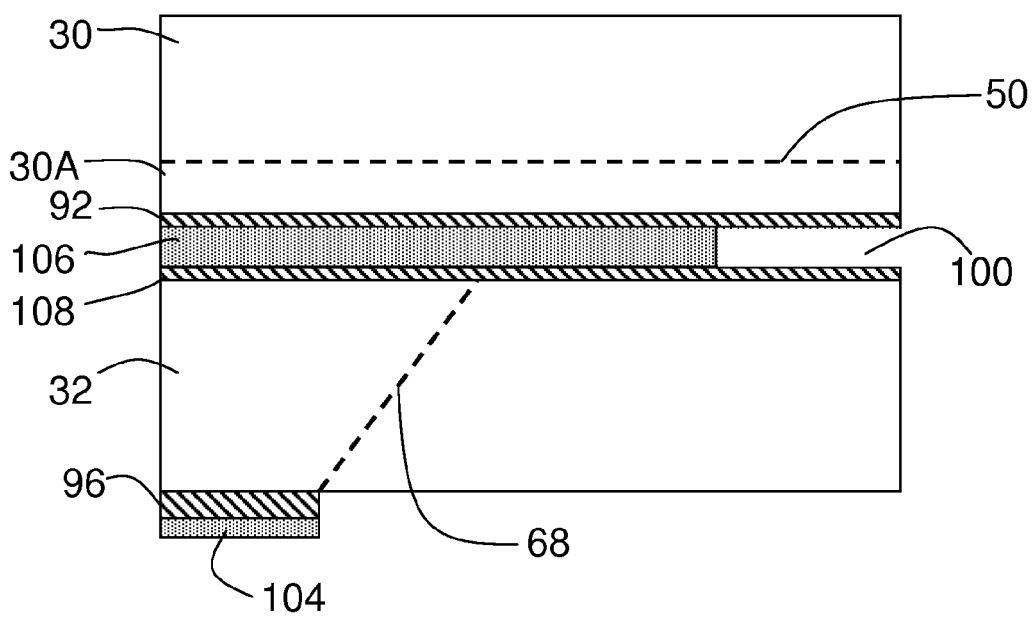

On the top side of the assembly, the probe wafer 30 is blanket etched as illustrated in FIG. 21 until the thickness of etched wafer 30 becomes equivalent to the desired tip height within the silicon film 30A. Alternatively, the probe wafer 30 can be mechanically ground to the desired thickness and polished to produce a smooth surface. On the bottom side, the support lower nitride layer 104 is photolithographically patterned for a support structure, the unmasked support lower oxide layer 96 is removed, and the exposed support wafer 32 is anisotropically wet etched until the tip upper oxide layer 108 is reached. The anisotropic etching also forms the inclined surface 68. As described in the preferred embodiment, these steps can also be performed with alternative processes.

Figure 22:
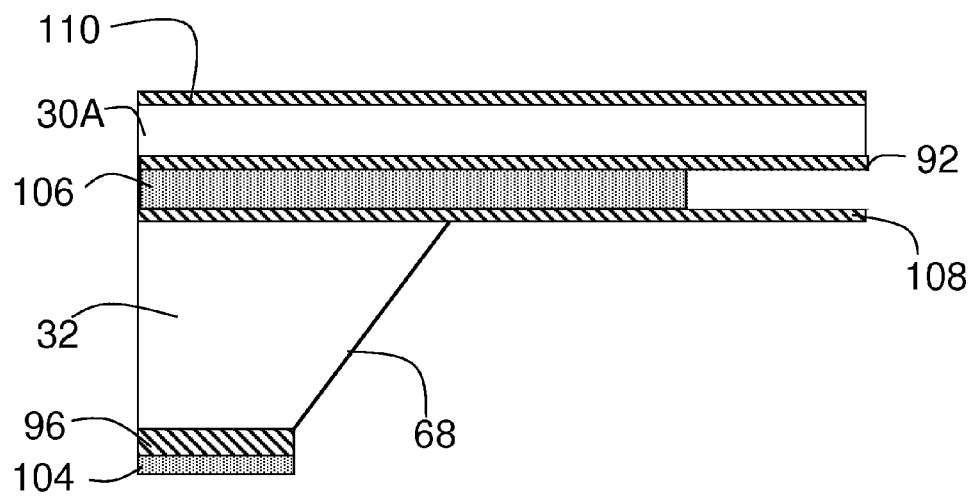
Figure 23:
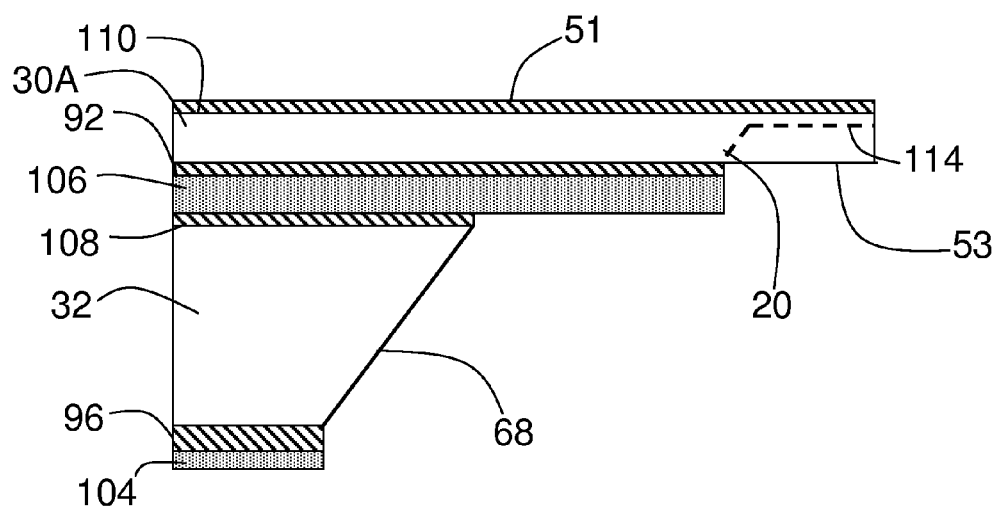

A protective oxide layer 110 illustrated in FIG. 22 is thermally grown on the silicon film 30A. The exposed portions of the tip lower oxide layer 92 and the support upper oxide layer 108 are etched away, as shown in FIG. 23 to expose the back side of the silicon film 30A away from the cantilever mask 106. The silicon film 30A is etched anisotropically from the back side in potassium hydroxide. Two slow-etching planes are encountered, corresponding to facets 18 of FIG. 1, to produce the corner 20 between the facets 18 forming two outer walls of the final tip.

Figure 24:
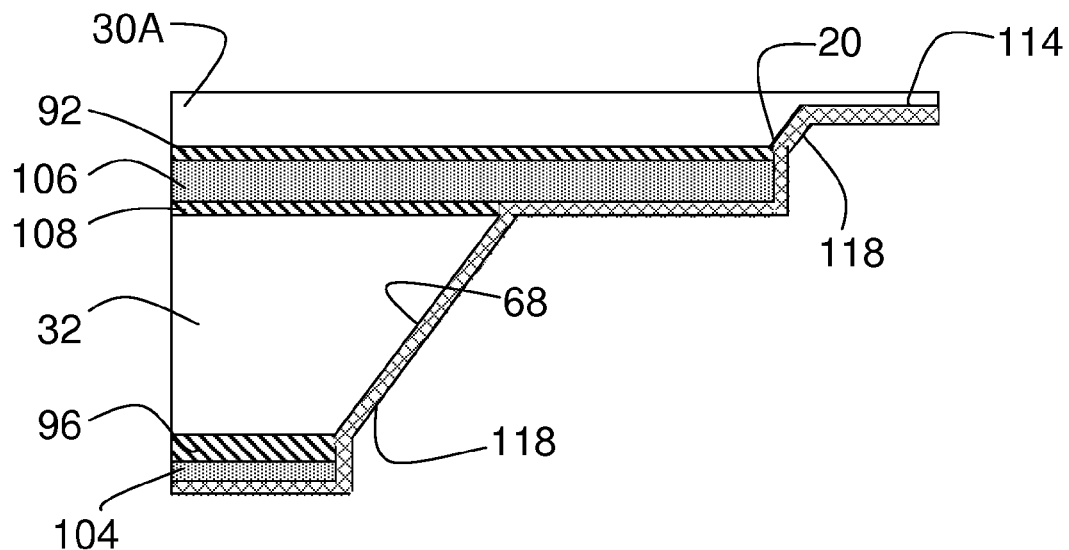

The vertical etching of the silicon film 30A is not completed all the way through so as to leave a residual overhead portion 114 shown in FIG. 23. The protective oxide layer 110 is removed from the top, as illustrated in FIG. 24 and a protective oxide layer 118 is deposited over the assembly from the back side including over the bottom of the overhead portion 114 to protect the bottom side of the silicon film 92 from etching in the formation of the tip.

Figure 25:
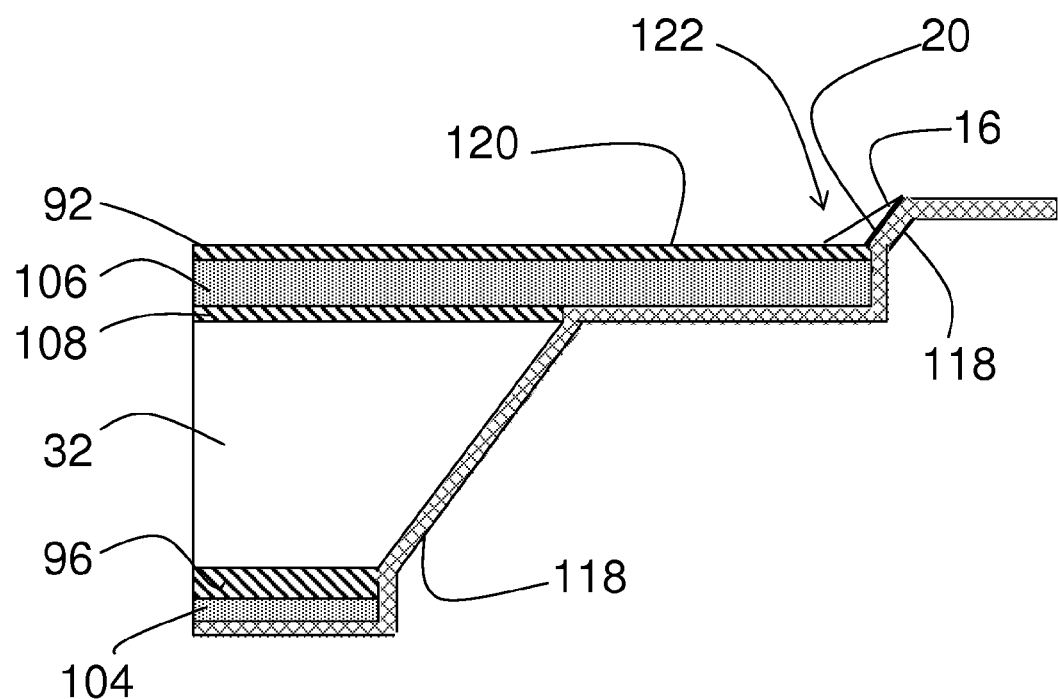
Figure 26:
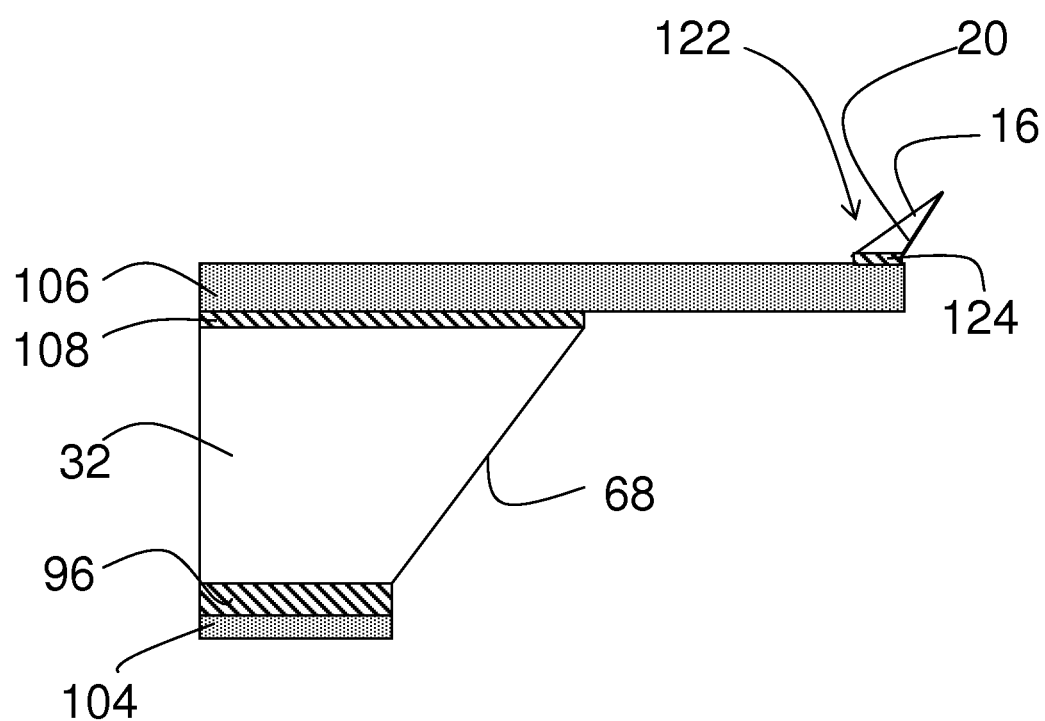

The silicon film 30A is anisotropically etched in potassium hydroxide until an upper surface 120 of the tip lower oxide layer 92 is reached, as shown in FIG. 25. Since the corner 20 and the associated facets 18 are covered by the protective oxide layer 118, the anisotropic etching of the silicon layer 30A will etch at an angle of 54.7° from the horizontal to form the facet 16 completing a tetrahedral tip 122. As shown in FIG. 26, the exposed portions of the protective oxide layer 118 are removed leaving an oxide pedestal 124 supporting the tetrahedral tip 112 on the cantilever 106. The tip 112 is isolated from remaining silicon portions but is supported on the top side of cantilever 106. The bottom side of the cantilever 106 is supported on the support structure developed in the support wafer 32.

Only two lithography steps are required and wet etching suffices for most steps. The first lithography step develops a cantilever pattern in a dielectric layer deposited on the probe wafer. The second lithography step develops a support pattern in a support wafer bonded to the first wafer. The final structure supports the cantilever on the support wafer across a dielectric layer. The most common dielectric materials are silicon dioxide and silicon nitride although other dielectrics are known in MEMS technology.

The above described processes are very flexible in producing probe assemblies with either silicon or silicon nitride cantilevers with embedded self-aligned silicon tips of desired height. The fabrication process is performed with great ease and accuracy using simple equipment. The process may be performed repeatedly and consistently. Since the tip is at the extreme distal end of the cantilever and projects at an oblique angle from the horizontal cantilever, the movement of the tip on the surface can be tracked in use and the desired location can be scanned accurately and repeatedly.

What is claimed is:

1. A method of fabricating a probe assembly, comprising the steps of:
    forming a dielectric layer on both sides of two, double side polished, monocrystalline silicon wafers with known crystal plane orientation, to form a first probe wafer silicon substrate and a second, support wafer silicon substrate,
    developing a cantilever pattern in a first dielectric layer on one side of the first probe wafer silicon substrate with known orientation relative to the crystal orientation of the silicon substrate; bonding the first and second silicon substrates together across the first dielectric layer with the cantilever pattern bonded between the first and second silicon substrates, followed by the subsequent steps of:
    developing a support structure in a second dielectric layer on the second support substrate selected from the exposed side of second silicon substrate;
    separating from the support structure a distal end of a cantilever developed according to the cantilever pattern and supported on the support structure at a proximal end of the cantilever; and forming in the probe substrate a three sided silicon tip projecting from a principal surface of the probe substrate in a direction up and away from the support substrate at a distal end of the cantilever wherein the tip is formed solely as a result of the crystal orientations and cantilever pattern alignment.

2. The method of claim 1, wherein the first dielectric layer comprises silicon dioxide.

3. The method of claim 1, wherein the first dielectric layer comprises silicon nitride.

4. The method of claim 1, wherein forming the cantilever and tip includes exposing the bonded substrates to a wet or dry anisotropic etchant.

5. The method of claim 4, wherein the etchant comprises a silicon crystalline plane dependent etch.

6. The method of claim 1, wherein the method includes two and only two photolithographic steps, one for the support and one for the cantilever.

7. The method of claim 1 wherein the crystal orientations are <100>.

* * * * *